UNITED STATES PATENT OFFICE.

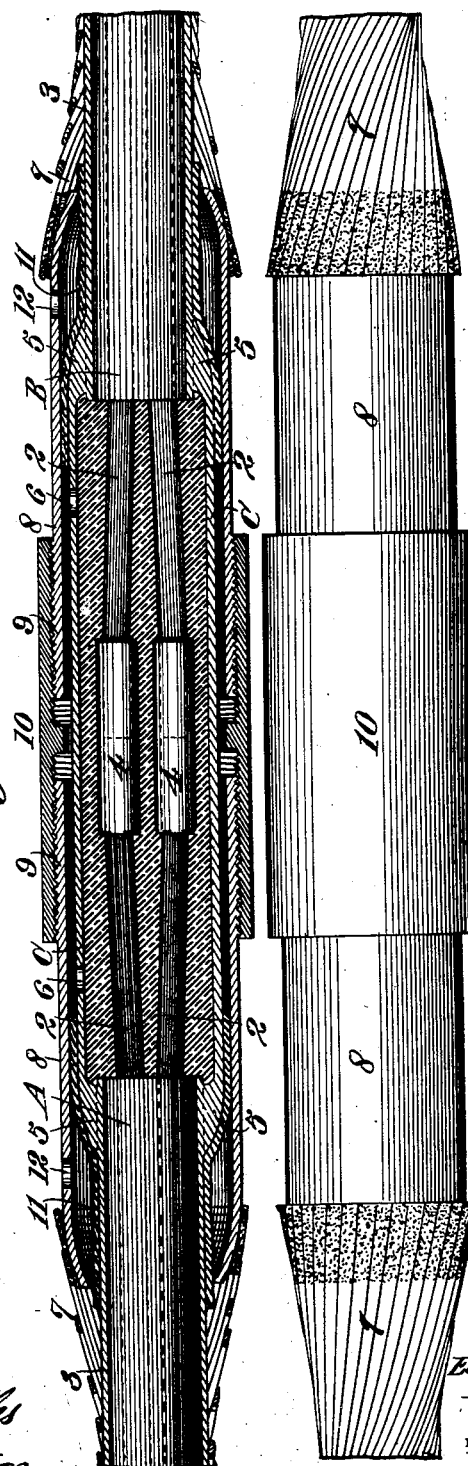

EDWIN W. BEARDSLEY, OF SAN FRANCISCO, AND PHILIP W. HAM, OF OAKLAND, CALIFORNIA.

CABLE-SPLICE.

1,241,809.  Specification of Letters Patent.  Patented Oct. 2, 1917.

Application filed January 5, 1916. Serial No. 70,415.

*To all whom it may concern:*

Be it known that we, EDWIN W. BEARDSLEY, of the city and county of San Francisco, State of California, and PHILIP W. HAM, of Oakland, county of Alameda, State of California, citizens of the United States, have invented new and useful Improvements in Cable-Splices, of which the following is a specification.

This invention relates to a cable splice particularly adapted for use in connection with armored submarine cables.

The object of the present invention is to provide a simple, substantial spliced construction, particularly designed for use in connection with armored electric submarine power or transmission cables, which construction is such:

First. That the slack between the armored wires may be taken up.

Second. That the splice of the electric conductors is relieved of all mechanical strain.

Third. That cutting away or wasting of the cable proper may be entirely eliminated.

Fourth. That a splice construction of minimum length is obtained. This being an important factor when it is necessary to pass the cable over sheaves or around reels or drums.

Further objects will hereinafter appear.

The invention consists of the parts and the construction and combination of parts as will hereinafter be more fully described and claimed, having reference to the accompanying drawings in which, Figure 1 is a central longitudinal section through the cable, showing the splice completed.

Fig. 2 is an exterior view of the cable, showing the splice completed.

Referring to the drawings in detail, A. and B. represent the cable ends to be spliced. These cables usually consist of three or more strands interwound and insulated from each other as indicated at 2, which in turn are wrapped with insulating material and inclosed with a lead tube or sheath 3. To splice the cable ends together, it is necessary to cut away a portion of the lead sheathing 3 to uncover the ends of the several strands 2. The insulating material, after removal, permits the individual strands to be inserted into sleeves such as shown at 4, in which they are brazed or soldered. Each individual splice or connection thus made is then wrapped to insulate one from the other and after each individual strand has been connected as described, a complete splice or connection between the cable ends A and B has been finished. A lead sleeve C is then slipped over the splice between the cable ends and passed over the ends of the lead sheaths or tubes 3, a wipe joint 5 being made to form a connection between same. An opening 6 is then cut in the sleeve C, through which an insulating compound is poured to fill the space between the cable ends and the sleeve C. This method of splicing cables, as far as described, is old and forms no part of the present invention.

Heretofore, when making a splice of the character described, it has been common practice to cut out long lengths of the lead covered cable to leave sufficient lengths of armor wire 7 to lay over the lead sleeve and also to permit a proper connection of same. This has however, been eliminated in the present instance as the overlaying of the armored wires is not necessary.

This is accomplished as follows:

Before the lead sleeve C has been applied or placed in position as shown in Fig. 1, a pair of sleeves 8 and a coupling member 10 are applied. The sleeves 8 are larger in diameter than the sleeve C and are therefore adapted to overlie and surround the sleeve as shown, when this is finally soldered in position. Each sleeve is threaded at the inner end as at 9, one thread being lefthand and the other righthand, and are therefore adapted to receive the coupling member 10, which is also threaded right and lefthand to receive the sleeves 8 and also to permit same to be drawn together. After the coupling 10 is applied, it is only screwed up for a short distance. The armor wires 7 are next laid back over the lead covered cable and over the ends of the sleeves 8 and are here securely connected by means of oxyacetylene or electric welding. The coupling 10 may now be screwed up tight and will thus take up all slack in the armor wires and relieve the electric conductors, lead sleeve and lead sheathing, of all mechanical stress.

During the process of welding the armor wires 7 to the sleeves 8, the lead sheath and sleeve are protected from the heat by a layer of asbestos paper or like material 11 wrapped around them and kept wet by injecting water through a series of small holes 12 drilled in the sleeves 8.

In the usual method of splicing, long lengths of lead covered cable are cut off and wasted to give sufficient lengths of armor to lay over the lead sleeve and connecting cable. By our method no cable is wasted which results in large savings where any considerable amount of cable is to be laid.

This method is simple, requiring no costly mechanical devices, and the splice can be made up in an exceptionally short time. A splice made up by this method is as strong mechanically as the armor wires themselves, and with the turnbuckle effect of the coupling all slack is drawn out of the armor wires, and the splice of the electric conductors is relieved of all mechanical strains.

The overall length of this splice is a minimum, which is an important factor when it is necessary to pass the cable over sheaves or around reels or drums.

The method is equally applicable where either wire or ribbon armored cable is used.

A cable made up with this splice can be reeled upon reels or drums and again relaid without injury to the splices, while it is impossible to reel up on a drum of practical size, a cable made up with the type of splice now in common use, without injury to the splice.

The materials and finish of the several parts of the splice coupling are such as the experience and judgment of the manufacturer may dictate.

We also wish it understood that various changes in form, proportions and minor details of construction may be resorted to within the scope of the appended claims and that we do not wish to limit ourselves to the specific design and construction here shown.

Having thus described our invention, what we claim and desire to secure by Letters Patent is:—

1. The combination with a pair of armor covered, lead sheathed cable ends and the splice connecting same, of a lead sleeve inclosing the splice and forming a connection between the lead sheathing on the cables, a pair of sleeves surrounding the lead sleeve threaded at their inner ends, and having their other ends secured to the cable armor, said sleeves being threaded right and left hand, and a right and left hand threaded coupling sleeve adapted to receive the threaded ends of the sleeves.

2. The combination with the splice connecting a pair of lead and wire armor covered cable ends, of a pair of sleeves to the outside of the outer ends of which the wire armor is adapted to be welded and means for drawing the sleeves together to take up all slack in the wire armor and to relieve the spliced cable ends and lead covering of all mechanical strain.

3. The combination with a pair of lead-covered spliced cable ends, and a wire armor inclosing the cables, of a pair of sleeve members to one end of which the wire armor is adapted to be welded, said sleeve members inclosing the lead covered spliced cable ends, a threaded extension on the opposite end of each sleeve, said threads being right and left-hand, and a right and left-hand threaded coupling sleeve adapted to receive the threaded ends of the sleeves.

4. The combination with a pair of lead and wire armor-covered cable ends, and the splice connecting same, of a lead sleeve inclosing the splice and forming a connection between the lead sheathing on the cable, a pair of sleeves surrounding the lead sleeve and threaded at their inner ends, the ends of the wire armor at the ends of the cable being welded to the outside of the outer ends of said sleeves, the threads on said sleeves being right and left, and a right and left threaded coupling sleeve adapted to receive the threaded ends of the sleeves.

5. The combination with the splice connecting a pair of lead and wire armor-covered cable ends, of a pair of sleeves to the outside of the outer ends of which the wire armor is adapted to be welded, and means for drawing the sleeves together to take up all slack in the wire armor and to relieve the spliced cable ends and lead covering of all mechanical strain, said sleeves being provided with openings through which water may be poured to keep the lead sheath and lead sleeve cool while the sleeves are being welded to the wire armor.

6. In combination, a splice connecting a pair of lead and wire armored cable ends, said splice including a sleeve welded to the ends of the inner armor of the cable, and an outer coupling connection welded to the outer cable armor.

7. In combination, a splice connecting a pair of lead and wire armored cable ends, said splice including a sleeve welded to the ends of the inner armor of the cable, and an outer coupling connection, the ends of the outer cable armor being welded to the outside of the ends of said outer coupling.

In testimony whereof we have hereunto set our hands in the presence of two subscribing witnesses.

EDWIN W. BEARDSLEY.
PHILIP W. HAM.

Witnesses:
GUY C. EARL,
W. H. SPAULDING.